United States Patent
Date et al.

(10) Patent No.: US 7,460,631 B2
(45) Date of Patent: Dec. 2, 2008

(54) COMMUNICATION SYSTEM WITH SYNCHRONIZATION ALLIANCES

(75) Inventors: Masaaki Date, Osaka (JP); Yuki Kubo, Osaka (JP); Kosuke Sekiyama, Fukui (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 604 days.

(21) Appl. No.: 11/287,228

(22) Filed: Nov. 28, 2005

(65) Prior Publication Data

US 2006/0114841 A1 Jun. 1, 2006

(30) Foreign Application Priority Data

Nov. 29, 2004 (JP) ............................. 2004-344609

(51) Int. Cl.
*H03D 3/24* (2006.01)
(52) U.S. Cl. ...................... 375/373; 375/371; 375/362; 375/356; 375/354
(58) Field of Classification Search ................ 375/373, 375/371, 362, 354, 356
See application file for complete search history.

(56) References Cited

U.S. PATENT DOCUMENTS

2005/0190796 A1* 9/2005 Date et al. .................. 370/503
2006/0050826 A1* 3/2006 Date et al. .................. 375/362

OTHER PUBLICATIONS

U.S. Appl. No. 10/939,489, filed Sep. 1, 2005, Date, Masaaki.
U.S. Appl. No. 11/217,376, filed Mar. 9, 2006, Date, Masaaki.
Waiyaresu LAN Akitekucha (Wireless LAN Architecture) edited by Matsushita et al., Kyoritsu Shuppan, 1996, pp. 47, 53-59, 69.

* cited by examiner

*Primary Examiner*—Ted Wang
(74) *Attorney, Agent, or Firm*—Venable LLP; Michael A. Sartori

(57) ABSTRACT

In a communication system including nodes laid out in a grid, each node operates on a repetitive internal timing cycle, at certain phases in which the node transmits data and state variable signals. The state variable signals transmitted by a node indicate its internal phase and its position in the grid. The advance of the phase at each node is governed by a phase response function, which drives neighboring nodes whose data transmissions could collide out of phase with each other, and a synchronization alliance function, which brings certain nodes having positional relationships that preclude data collisions into phase with each other. A highly efficient data transmission timing pattern can thereby be established autonomously.

16 Claims, 10 Drawing Sheets

COMMUNICATION SYSTEM WITH SYNCHRONIZATION ALLIANCES

BACKGROUND OF THE INVENTION

1. Field of the Invention

The present invention relates to a communication control apparatus, a communication control method, a node, and a communication system. More particularly, it relates to an autonomous distributed communication control method for use in a communication system with nodes arranged in a grid.

2. Description of the Related Art

Known methods by which a plurality of spatially distributed nodes can transmit data without collisions include time division multiple access (TDMA) and carrier sense multiple access (CSMA), the latter including carrier sense multiple access with collision avoidance (CSMA/CA) and carrier sense multiple access with collision detection (CSMA/CD). A discussion of these methods can be found in, for example, Waiyaresu LAN Akitekucha (Wireless LAN Architecture), edited by Matsushita and Nakagawa, Kyoritsu Shuppan, 1996, pp. 47, 53-59, and 69 (in Japanese).

A weakness of the TDMA system is that if the central administrative node that assigns time slots malfunctions, the entire communication system may be brought down. Various collision avoidance methods in which the individual nodes adjust their time-slot assignments autonomously, without the need for a central administrative server, have therefore been proposed, as in Japanese Patent Applications No. 2003-328530, No. 2004-257562, and No. 2004-257567. In these proposed methods, each node interacts with its neighboring nodes by transmitting impulse signals at regular intervals and adjusting the timing of these intervals according to the timing of the impulse signals received from the neighboring nodes, using a nonlinear model that forces the transmission timing away from the receiving timing. A group of interacting nodes can thereby establish non-overlapping time slots in which to transmit data without collisions.

A plurality of nodes can be spatially distributed in many ways, one of which is a grid. When nodes are distributed in a grid pattern, in theory there is an optimal time-division communication mode in which the time slots of mutually adjacent nodes fit together in a non-overlapping pattern with very little lost time, resulting in highly efficient communication. When the above methods of autonomous time-slot assignment are applied to a grid of nodes, however, the nodes are unable to achieve this ideal mode of time-division communication and are therefore unable to reach the ideal level of communication efficiency.

It would therefore be desirable to have a communication control apparatus and method, a node, and a communication system in which a plurality of nodes arranged in a grid can autonomously adjust their data transmission timing to achieve high communication efficiency without requiring timing instructions from a central administrative server.

SUMMARY OF THE INVENTION

An object of the present invention is to enable a communication grid to reach a highly efficient communication timing arrangement autonomously.

The invention provides a timing control apparatus that can be installed in each node in a communication system in which the nodes are laid out in a grid. The timing control apparatus operates on a repetitive internal timing cycle, at certain phases in which the node transmits data and state variable signals. In the timing control apparatus, a communication timing calculator derives the phase state of the internal timing cycle and thereby determines the data transmission timing. The communication timing calculator includes a phase calculator, a collision rate calculator, a phase response function characteristic determiner, and a synchronization alliance unit.

The phase calculator varies the internal phase according to a phase response function and a synchronization alliance function. These functions adjust the phase on the basis of state variable signals received from neighboring nodes in the grid, representing the spatial position and internal timing phase of those nodes. The combination of these functions constitutes what is termed a time series rule.

The collision rate calculator observes differences between the internal phase of its own node and the internal phases of the neighboring nodes, and calculates a data transmission collision rate on the basis of these differences.

The phase response function characteristic determiner alters the phase response function according to the collision rate and the spatial positions indicated by the received state variable signals.

The synchronization alliance unit alters the synchronization alliance function according to the spatial positions indicated by the received state variable signals.

This method of communication control enables the phase response function characteristic determiner to operate so as to drive the node out of phase with other nodes with which data transmission collisions can occur, while the synchronization alliance unit drives the node into phase with nodes in spatial positions such that data transmission collisions cannot occur.

As a result, the nodes can autonomously reach an ideal transmission timing arrangement in which nodes in a regular pattern of positions in the grid form a synchronization alliance and transmit data simultaneously, the nodes in the alliance being mutually separated by sufficient distances that the data transmissions do not collide. Several such alliances can be formed to transmit data in a pattern of tightly interlocked time slots with high efficiency. This efficient state is reached without the need for timing instructions from a central administrative node.

The invention also provides a node including the invented communication control apparatus, and a communication system including a plurality of such nodes, arranged in a grid.

DETAILED DESCRIPTION OF THE INVENTION

Figure 1:
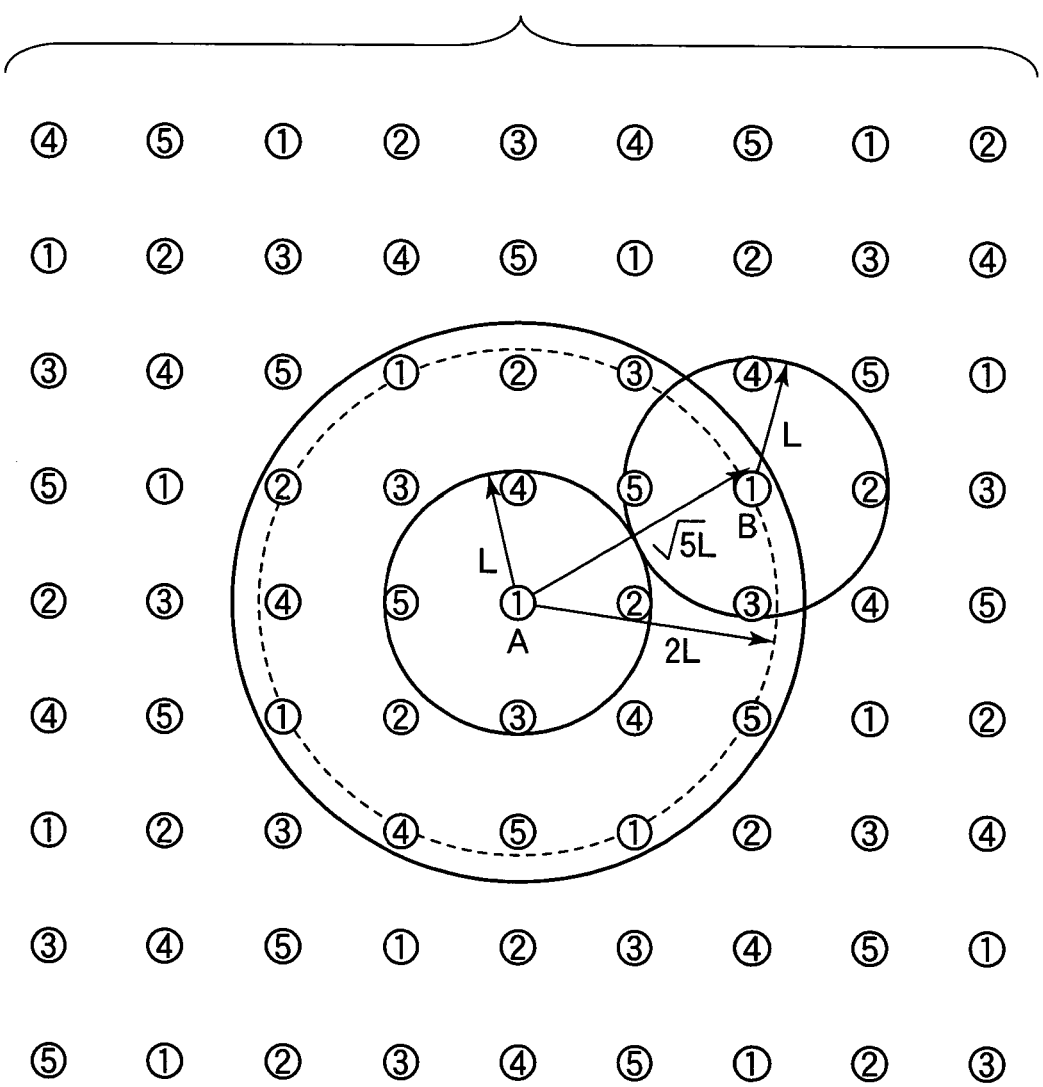
FIG. 1 illustrates a grid of nodes constituting a communication system in which the present invention may be used.

Embodiments of the invention will now be described with reference to the attached drawings, in which like elements are indicated by like reference characters.

Referring to FIG. 1, the communication system contemplated in the embodiments below comprises a plurality of nodes arranged in a grid with a distance L between adjacent nodes. The nodes are numbered to express synchronization alliances. In the steady state, nodes with the same number operate in phase with each other, that is, they transmit data at the same time, while nodes with different numbers operate out of phase with each other. The nodes communicate over a range L and interact over a range of $\sqrt{5}L$ (also written as $5^{1/2}L$); that is they can receive data signals transmitted over distances up to L between nodes, and can receive interaction signals transmitted over distances up to $\sqrt{5}L$. Nodes A and B, for example, can interact with each other, but they can also transmit data simultaneously without having the data signals collide at any other node. If node A and another node within the circle of radius 2L centered on node A transmit data simultaneously, however, the transmitted data may collide.

FIRST EMBODIMENT

Figure 2:
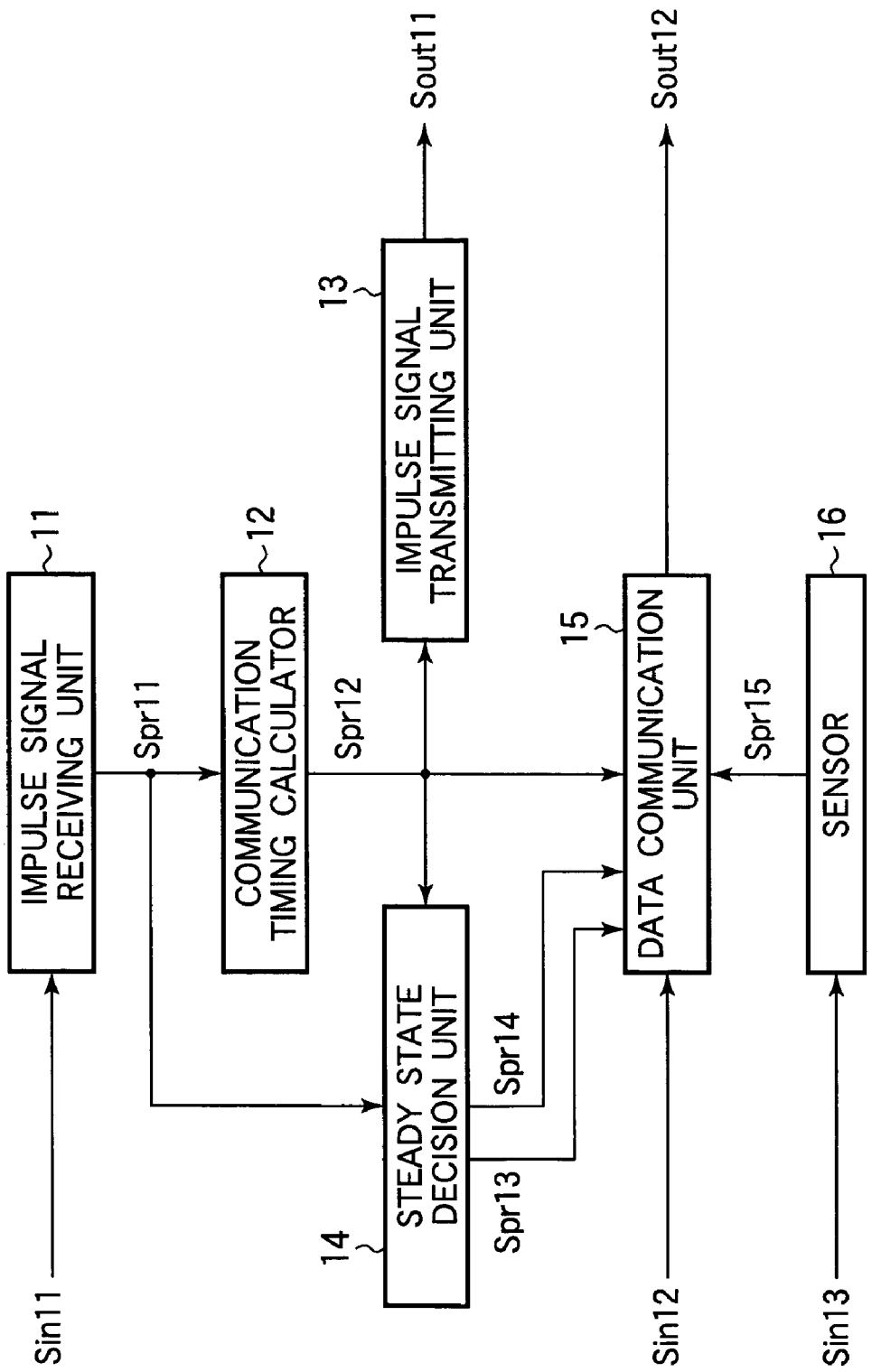
FIG. 2 is a functional block diagram of a node in a first embodiment of the invention.

Referring to FIG. 2, each node 10 in the first embodiment comprises an impulse signal receiving unit 11, a communication timing calculator 12, an impulse signal transmitting unit 13, a steady-state decision unit 14, a data communication unit 15, and a sensor 16. The impulse signal receiving unit 11, communication timing calculator 12, impulse signal transmitting unit 13, and steady-state decision unit 14 combine to function as a communication control apparatus.

The impulse signal receiving unit 11 receives input impulse signals Sin11 transmitted by neighboring nodes. Two nodes are considered to be neighboring if they are within receiving range of each other's impulse signals. An impulse signal is generally a timing signal and may have, for example, a Gaussian waveshape, but when an impulse signal is used as an interaction signal, information indicating the spatial position of the transmitting node (address information) is added. Thus the output impulse signals Sout11 transmitted by the impulse signal transmitting unit 13 described below are timing signals that are modulated with address information and transmitted at a particular phase in a timing cycle. The impulse signal receiving unit 11 outputs received impulse signals Spr11, which it may obtain by reshaping or regenerating the input impulse signals Sin11.

The communication timing calculator 12 calculates the value of a phase signal Spr12 by which the communication timing of the node is regulated, cycling the phase value at a basically constant rate but with adjustments according to the received impulse signals Spr11. The phase signal Spr12 at the i-th node will also be denoted $\theta_i(t)$ below, where t represents time. The adjustments are carried out according to a nonlinear rule that drives mutually interacting nodes into or out of phase with each other.

FIGS. 3A, 3B, 3C, 4A, 4B, and 4C show two simplified examples of the adjustment process, illustrating the case in which the interacting nodes are driven out of phase.

Figure 3A:
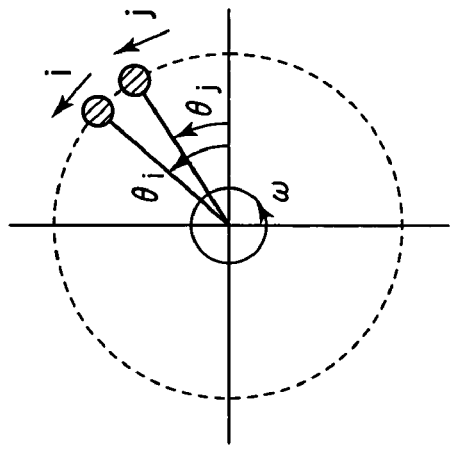
FIG. 3A illustrates an initial state of interaction between two nodes in the first embodiment.
Figure 3B:
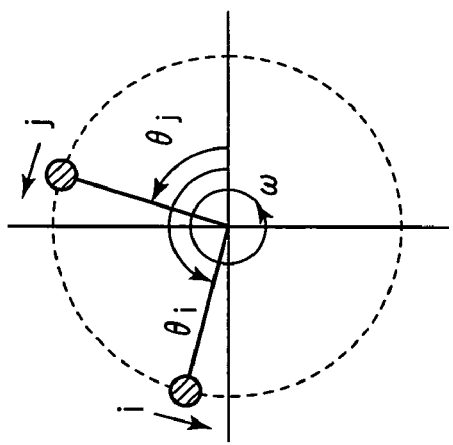
FIG. 3B illustrates a transitional state during interaction between the two nodes.
Figure 3C:
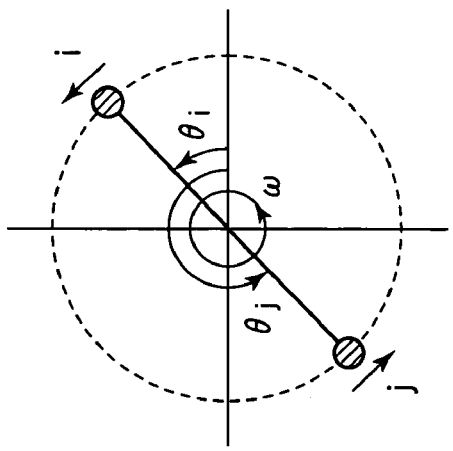
FIG. 3C illustrates the steady state during interaction between the two nodes.

In FIGS. 3A, 3B, and 3C, just one neighboring node j interacts with the node of interest i. FIG. 3A shows an exemplary initial state. Timing is modeled by the motion of two point masses rotating at a basic angular velocity expressed by a natural angular frequency parameter ω around a circle that expresses the communication timing of nodes i and j as phase values $\theta_i(t)$, $\theta_j(t)$. If the rotational motion of a point mass is projected onto the vertical axis or horizontal axis, the motion of the projected point exhibits a harmonic nonlinear oscillation or rhythm. The two nodes interact by transmission and reception of impulse signals (Sout11, Sin11), adjust their angular velocities as a result of the interaction, and reach a steady state in which a complementary phase relationship is maintained. This process can be understood as operating by mutual repulsion of the two point masses as they rotate. More specifically, the communication timing calculator 12 at each node alters (quickens or slows) the timing phase velocity of its own node so as to move the timing phase gradually away from the timing phase of the other node. With elapse of time the initial state in FIG. 3A passes through a transitional state such as the one in FIG. 3B and finally settles into the steady state shown in FIG. 3C, in which the two nodes operate with opposite timing phase (a phase difference of π radians) and can transmit non-colliding output impulse signals and data.

Figure 4A:
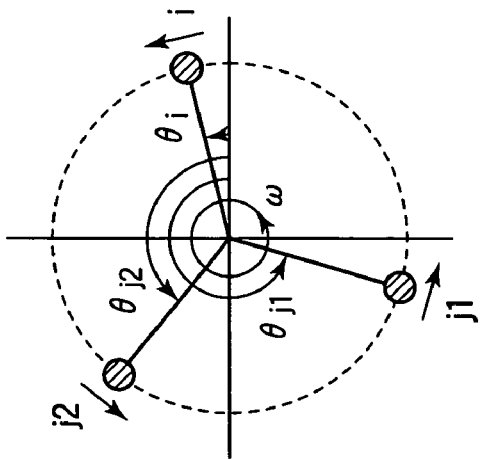
FIG. 4A illustrates an initial state of interaction among three nodes in the first embodiment.
Figure 4B:
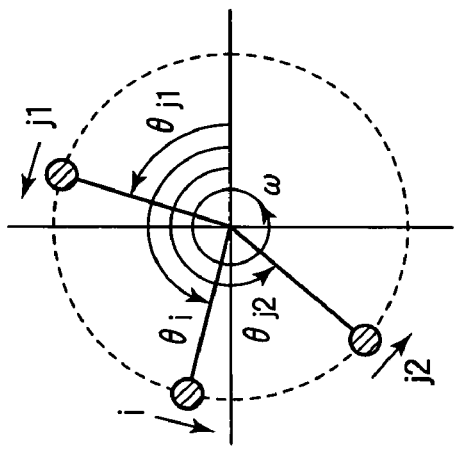
FIG. 4B illustrates a transitional state during interaction among the three nodes.
Figure 4C:
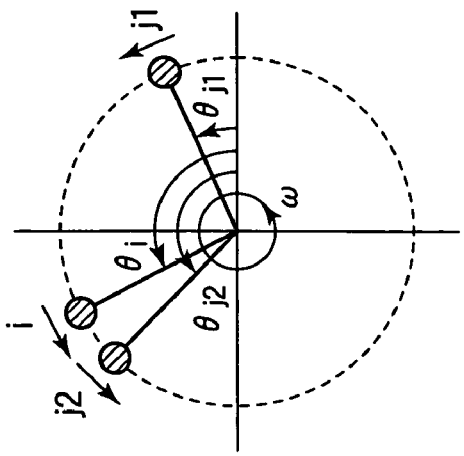
FIG. 4C illustrates the steady state during interaction among the three nodes.

In FIGS. 4A, 4B, and 4C two nodes j1 and j2 interact with the node of interest i. FIG. 4A shows an exemplary initial state, FIG. 4B shows a transitional state, and FIG. 4C shows the steady state in which the phases at the three nodes are maximally separated.

If the number of interacting nodes changes during the course of system operation, the steady state changes adaptively. For example, if two interacting nodes have established a stable phase relationship as in FIG. 3C and then a third node joins the interaction, the stability of the phase relationship is destroyed, but after passing through a transitional state, the system assumes a new steady state like the one in FIG. 4C. Similar adaptation occurs when a node is removed or stops functioning.

In the present embodiment, in which the nodes are disposed in a grid pattern, the phase velocity adjustment is performed according to a mathematical formula (1) that will be described in more detail later.

Referring again to FIG. 2, the communication timing calculator 12 outputs the first phase signal Spr12 or $\theta_i(t)$ to the impulse signal transmitting unit 13, steady-state decision unit 14, and data communication unit 15.

The impulse signal transmitter 13 transmits the output impulse signal Sout11 according to the phase signal Spr12. More specifically, it transmits an output impulse signal Sout11 each time the phase signal Spr12 takes on a specific value α ($0 \leq \alpha \leq 2\pi$). A single value of α is preferably set for the entire system: in the following description it will be assumed that α=0 uniformly throughout the system. In the example in FIG. 3C, in which nodes i and j operate π radians out of phase, the timing of the output impulse signals Sout11 transmitted from node i is π radians out of phase with the timing of the output impulse signals Sout11 transmitted from node j.

The steady-state decision unit 14 decides whether the transmission timings of the output impulse signals Sout11 at its own node and neighboring nodes are in a transitional state (as in FIG. 3B or 4B) or a steady state (as in FIG. 3C or 4C). The steady-state decision unit 14 observes the timing of the received impulse signals Spr11 (corresponding to output impulse signals Sout11 transmitted by other nodes) and the output impulse signals Sout11 transmitted by its own node, and decides that they are in the steady state if the timing differences are stable. In the present embodiment, the steady-state decision unit 14 recognizes the output timing of impulse signals Sout11 output from its own node by receiving the phase signal Spr12 instead of the output impulse signal. The steady-state decision can be made, for example, as follows.

(a) The value β of the phase signal Spr12 at the timing of occurrence of each received impulse signal Spr11 is observed for one basic period of the phase signal Spr12. Let the values β of the phase signal Spr12 obtained as a result of performing the above observation be:

$$\beta_1, \beta_2, \ldots, \beta_N \, (0 < \beta_1 < \beta_2 < \ldots < \beta_N < 2\pi)$$

(b) The differences (phase differences) Δ between adjacent values are calculated from the observed values β of the phase signal Spr12.

$$\Delta_1 = \beta_1, \Delta_2 = \beta_2 - \beta_1, \ldots, \Delta_N = \beta_N - \beta_{N-1}$$

(c) Processes (a) and (b) above are carried out at intervals of one period of the phase signal Spr12 and the rate of change γ (differences) in the phase difference Δ between adjacent periods are calculated.

$$\gamma_1 = \Delta_1(\tau+1) - \Delta_1(\tau), \gamma_2 = \Delta_2(\tau+1) - \Delta_2(\tau), \ldots, \gamma_N = \Delta_N(\tau+1) - \Delta_N(\tau)$$

where τ indicates discrete time in units of one period of the phase signal Spr12.

The steady state is recognized when the above rates of change γ are all smaller than a predetermined value ε.

$$\gamma_1 < \epsilon, \gamma_2 < \epsilon, \ldots, \gamma_N < \epsilon$$

It is also possible, however, to make the steady state decision according to whether the decision condition $$\gamma_1 < \epsilon, \gamma_2 < \epsilon, \ldots, \gamma_N < \epsilon$$

is satisfied over M periods (where M is an integer greater than two). The larger the value of M is, the more stable the state must be in order for the steady-state decision unit 14 to decide that the steady state has been reached. Alternatively, the decision may be based on only some of the received impulse signals.

At intervals equal to one period of the phase signal Spr12, the steady-state decision unit 14 sends the data communication unit 15 a steady-state decision signal indicating the decision result, and a slot signal equal to the first observed phase value $\beta_1$ in the current cycle of the phase signal $\theta_i(t)$. Use of the first observed phase value $\beta_1$ is related to the condition α=0 given above. If a different value of a is selected, a different β may be used.

The sensor 16 senses a property of the physical environment of the node, such as sound pressure, vibration, chemical concentration, temperature, or any other measurable property. The sensed property acts as an input signal Sin13, from which the sensor 16 generates observation data Spr15. The sensor 16 sends the observation data Spr15 to the data communication unit 15. The data communication unit 15 also receives the output data signals Sout12 transmitted by neighboring nodes as input data signals Sin12.

The data communication unit 15 transmits the observation data Spr15 or the input data signal Sin12 (or both) to other nodes as an output data signal Sout12. The output data signal Sout12 is transmitted when the steady-state decision signal Spr13 indicates that the steady state has been recognized, and is not transmitted when the steady-state decision signal Spr13 indicates a transitional state. The output data signal Sout12 and output impulse signal Sout11 are transmitted in the same frequency band. The output data signal Sout12 is transmitted in a time slot (time interval) described below. The term 'time slot' will be used even though it does not denote a fixed time interval allocated by the system.

A time slot is the interval in which the phase $\theta_i(t)$ indicated by the phase signal Spr12 satisfies the following condition.

$$\delta_1 \leq \theta_i(t) \leq \beta_1 - \delta_2$$

The time slot starts when transmission of the output impulse signal Sout11 has ended, at which point the value of the phase signal is $\delta_1$. The time slot ends at a time preceding the timing of the first received impulse signal Spr11 in each cycle of the phase signal Spr12 by an offset $\delta_2$, at which point the value of the phase signal is $\beta_1 - \delta_2$. The parameters $\delta_1$ and $\delta_2$ are phase angles corresponding to short periods of time which need only be adequate to assure that impulse signals (transmitted by the node 10 or another node) and data signals (transmitted by the node 10 or another node) do not occupy the wireless space around the node 10 simultaneously. The values of $\delta_1$ and $\delta_2$ may be determined experimentally under actual operating conditions.

In FIG. 3C, for example, node i starts transmitting an output impulse signal Sout11 when its phase $\theta_i$ is zero, completes transmission of the output impulse signal Sout11 before phase $\theta_i$ reaches $\delta_1$, starts transmitting an output data signal Sout12 when phase $\theta_i$ is equal to $\delta_1$, and completes the transmission of the output data signal Sout12 when phase $\theta_i$ is equal to $\beta_1 - \delta_2$ (where $\beta_1 \approx \pi$). Node i then halts transmission of output impulse signals Sout11 and output data signals Sout12 until the phase $\theta_i$ reaches zero again. Node j operates in similar fashion, based on its own phase $\theta_j$. Since phase $\theta_i$ and phase $\theta_j$ differ by substantially π radians, the transmissions do not collide. Similar non-colliding transmission is carried out when there are three nodes or more.

The output data signals Sout11 transmitted by node 10 may be used either to relay data (Sin12) received from another node or to transmit data (Sin13) originating at node 10. The sensor 16 is shown as one example of a means for generating data originating at node 10.

The operation of the communication timing calculator 12 will now be described in more detail.

Figure 5:
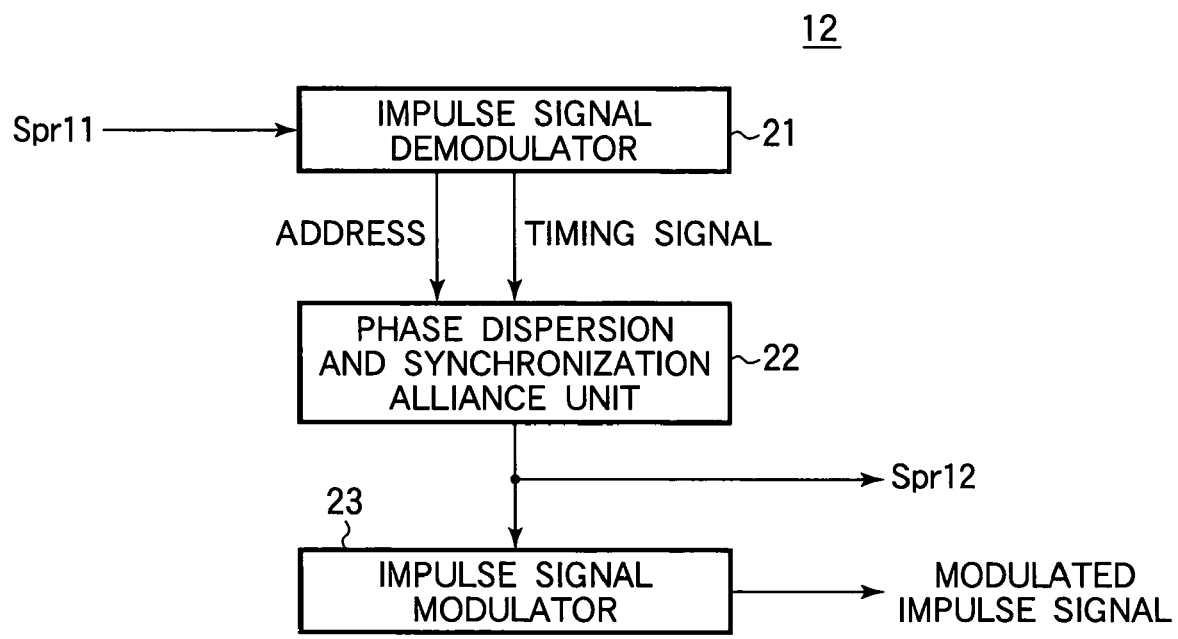
FIG. 5 is a functional block diagram of the communication timing calculator in the first embodiment.

Referring to FIG. 5, the communication timing calculator 12 comprises an impulse signal demodulator 21, a phase dispersion and synchronization alliance unit 22, and an impulse signal modulator 23.

As noted above, the impulse signals transmitted for the purpose of interaction include information (address information) indicating the spatial position of the transmitting node. The output impulse signal Sout11 is therefore a timing signal transmitted at a particular phase in the node's timing cycle, but it is modulated with information indicating the spatial position of the node. The impulse signal demodulator 21 demodulates the received impulse signal Spr11 and thereby separates the spatial position information from the timing signal component.

The phase dispersion and synchronization alliance unit 22 receives both the spatial position information and the timing signal from the impulse signal demodulator 21, and executes a computation that updates the phase of its own node, thereby generating the phase signal Spr12, which is supplied to the impulse signal modulator 23 as well as the impulse signal transmitting unit 13, steady-state decision unit 14, and data communication unit 15.

The impulse signal modulator 23 generates a modulated impulse signal by modulating information indicating the spatial position of its own node onto a timing signal generated for its own node on the basis of the phase signal Spr12, which it receives as the result of the phase calculation by the phase dispersion and synchronization alliance unit 22. The timing signal is generated for the impulse signal transmitting unit 13, which only has to transmit the modulated impulse signal to other nodes as the output impulse signal Sout11.

The detailed structure of the phase dispersion and synchronization alliance unit 22 will be described with reference to the functional block diagram shown in FIG. 6.

As shown in the figure, the phase dispersion and synchronization alliance unit 22 comprises a phase calculator 31, a collision rate calculator 32, a cumulative stress calculator 33, a stress response function calculator 34, a phase response function characteristic determiner 35, and a synchronization alliance unit 36.

The communication timing calculator 12 carries out the computations described above and determines output impulse signals Sout11. The communication timing calculator 12 performs the computations for determining transmission timings through use of an equation expressing a nonlinear oscillation model, such as the following equation (1):

$$\frac{d\theta_i(t)}{dt} = \omega_i + \sum_{j \in Xi} P_j(t) \cdot R(\Delta\theta_{ij}(t)) + \sum_{j \in Yi} P_j(t) \cdot H(\Delta\theta_{ij}(t)) + \xi(S_i(t)) \quad (1)$$

$$\Delta\theta_{ij}(t) = \theta_j(t) - \theta_i(t) = -\theta_i(t) \quad (2)$$

The natural angular frequency parameter $\omega_i$ represents the basic rhythm of the node. It is assumed here that $\omega_i$ has a uniform value throughout the system. Equation (1) represents a rule for temporally varying the rhythm of node i in response to input of received impulse signals Spr11. The received impulse signals Spr11 correspond to the output impulse signals transmitted from neighboring nodes in the mutual interaction range.

In equation (1), variable t represents time, and the function $\theta_i(t)$ represents the phase of node i at time t in nonlinear oscillation. The value of $\theta_i(t)$ is calculated modulo $2\pi$, by dividing by $2\pi$ and taking the remainder, so that $\theta_i(t)$ is always within the following range:

$$0 \leq \theta_i(t) < 2\pi$$

$\Delta\theta_{ij}(t)$ is a phase difference obtained by subtracting the phase $\theta_i(t)$ of node i from the phase $\theta_j(t)$ of neighboring node j. For the sake of convenience, the value $\Delta\theta_{ij}(t)$ is also calculated modulo $2\pi$, by taking the remainder, when divided by $2\pi$, of the sum of $2\pi$ plus the phase difference $\Delta\theta_{ij}(t)$, bringing $\Delta\theta_{ij}(t)$ within the following range:

$$0 \leq \Delta\theta_{ij}(t) < 2\pi$$

The output impulse signal Sout11 is assumed without loss of generality to be transmitted when the phase $\theta_i(t)$ of node i is 0. Node i can therefore observe the phase difference $\Delta\theta_{ij}(t)$ by observing its own phase value $\theta_i(t)$ at just the timing when an output impulse signal Sout11 is received from node j, once per timing cycle. At that timing, the phase difference $\Delta\theta_{ij}(t)$ is equal to $-\theta_i(t)$, as expressed in equation (2). The phase difference $\Delta\theta_{ij}(t)$ is calculated in this way in the present embodiment.

The function $P_j(t)$ is a timing signal obtained by eliminating information indicating the spatial location of node j from the received impulse signal Spr11 provided by receiving the output impulse signal Sout11 transmitted by node j. As explained above, this spatial location information or address information is modulated onto the output impulse signal Sout11 when the output impulse signal Sout11 is transmitted and is separated from the output impulse signal Sout11 by the impulse signal demodulator 21 when the output impulse signal Sout11 is received. The spatial location information is used to select whether to compute the function $R(\Delta\theta_{ij}(t))$ or $H(\Delta\theta_{ij}(t))$ in equation (1).

$R(\Delta\theta_{ij}(t))$ is a phase response function representing the variation of the basic rhythm of its own node in response to input of the received impulse signal Spr11. $R(\Delta\theta_{ij}(t))$ has a nonlinear characteristic that pushes the phase $\theta_i(t)$ of node i away from the phase of node j. The symbol $X_i$ in equation (1) represents the set of nodes to be repelled in this way, in the mutual interaction range of node i. $X_i$ represents the entire set of nodes within the mutual interaction range of node i, except for nodes belonging to a set $Y_i$ which will be described later. Accordingly, the summation term including the function $R(\Delta\theta_{ij}(t))$ has a dynamic characteristic that repels the phase of node i from the phase of the node j that transmitted the received impulse signal Spr11 if node j is within mutual interaction range and does not belong to the set $Y_i$, as determined from the spatial location information received with the received impulse signal Spr11.

$H(\Delta\theta_{ij}(t))$, which will be referred to as a synchronization alliance function, also represents a variation of the basic rhythm of its own node in response to input of the received impulse signal Spr11. Unlike the phase response function $R(\Delta\theta_{ij}(t))$, the synchronization alliance function $H(\Delta\theta_{ij}(t))$ has a dynamic characteristic that pulls the phase of node i toward the phase of one or more allied neighboring nodes j within the mutual interaction range of node i. The synchronization alliance unit 36 executes the computation of the summation term including $H(\Delta\theta_{ij}(t))$.

The allied neighboring nodes (the nodes in set $Y_i$) are disposed in the vicinity of certain predetermined points or in a certain area. The allied neighboring nodes in the present embodiment are any nodes disposed within circles of radius r centered on points (2L, L), (-L, 2L), (-2L, -L), or (L, -2L) viewed from the spatial location of node i, r being smaller than L. The point (n, m) represents a spatial location horizontally removed by a distance n and vertically removed by a distance m in FIG. 1. The allied neighboring nodes of node A in FIG. 1 are the other nodes numbered '1' within the mutual interaction range of node A.

Incidentally, the locations of the allied nodes in set $Y_i$ are not unique; they could be varied to mirror-symmetrical locations (-2L, L), (L, 2L), (2L, -L), and (-L, 2L). Whether an impulse signal is received from one of the allied neighboring nodes is determined in accordance with the spatial location information.

The dynamic characteristic that pulls the phase of a node toward the phase of its allied neighboring nodes is nonlinear. When this characteristic has exerted its effect and brought the node and its allied neighboring nodes in phase with one another, other neighboring nodes can establish a desirable phase relationship with these nodes without breaking up the in-phase relationship of the allied nodes. The phase relationship between a node and a neighboring node other than the allied neighboring nodes is adjusted in accordance with the phase response function $R(\Delta\theta_{ij}(t))$.

The symbol $Y_i$ in equation (1) represents the set of nodes to be synchronized within the mutual interaction range of node i. Accordingly, the summation term including the synchronization alliance function $H(\Delta\theta_{ij}(t))$ in equation (1) exerts a dynamic characteristics to synchronize the phase of node i only when the received impulse signal Spr11 is transmitted from one of the allied neighboring nodes with which node i is to be synchronized within the mutual interaction range.

An example of the synchronization alliance function $H(\Delta\theta_{ij}(t))$ described above is given by equations (3) and (4) below, although the function used to implement the dynamic characteristic described above is not limited to this form.

$$H(\Delta\theta_{ij}(t)) = \Delta\theta_{ij}(t) \quad 0 \leq \Delta\theta_{ij}(t) < \pi \quad (3)$$

$$H(\Delta\theta_{ij}(t)) = \Delta\theta_{ij}(t) - 2\pi \quad \pi \leq \Delta\theta_{ij}(t) < 2\pi \quad (4)$$

The function $\xi(S_i(t))$ produces a phase shift of random magnitude responsive to a stress function $S_i(t)$ that accumulates stress when the relative phase difference between the i-th node and other nodes is small. The relative phase difference is defined as a quantity E calculated from the phase difference $\Delta\theta_{ij}$ by the following rule:

If $\Delta\theta_{ij} \leq \pi$ then $E = \Delta\theta_{ij}$ (5)

If $\Delta\theta_{ij} > \pi$ then $E = 2\pi - \Delta\theta_{ij}$ (6)

The function $\xi(S_i(t))$ in equation (1) represents a response to cumulative stress, and will be referred to below as a stress response function.

One feature of the first embodiment is that, even if there is no central administrative node, the nodes can determine their own time slot assignments in an autonomous and distributed manner by interacting with their neighboring nodes and modifying their phase signals through use of a nonlinear oscillation model. Another feature is the inclusion of the stress response function $\xi(S_i(t))$ in the nonlinear oscillation model to avoid a situation in which a node becomes stabilized in a steady state even though the phase difference between the node and a neighboring node is extremely small.

Specific examples of the phase response function $R(\Delta\theta_{ij}(t))$ and the stress response function $\xi(S_i(t))$ will now be given. The description will begin with definitions of the terms 'data transmission collision', 'time-based collision rate', and 'count-based collision rate'.

Data Transmission Collision

Let $\phi_c$ be the phase width corresponding to the width $W_{min}$ of the smallest time slot that a node needs in order to transmit data. The phase width can be calculated as the product of $W_{min}$ and the natural angular frequency parameter $\omega$ ($\phi_c = W_{min} \cdot \omega$). The width $W_{min}$ is a constant parameter that is determined according to the application.

A data transmission collision is defined to have occurred when the relative phase difference between a first node and a second node within impulse signal receiving range of the first node is less than the above phase width $\phi_c$. A data transmission collision therefore occurs when the relative phase difference is less than phase width $\phi_c$ for even one received impulse signal Spr11.

Time-Based Collision Rate

Let $x_i(t)$ be a function expressing the occurrence or non-occurrence of a data transmission collision at node i. This function $x_i(t)$ is defined by the following equation (7) which means that $x_i(t)$ takes the value '1' if a collision occurs at time t and the value '0' otherwise ('else').

$$x_i(t) = 1 \quad \text{collision} \quad (7)$$
$$x_i(t) = 0 \quad \text{else}$$

$$y_i(t) = \int_{t-nTi}^{t} x_i(\tau) d\tau \quad (8)$$

$$c_i(t) = \frac{\omega_i \cdot y_i(t)}{n \cdot \phi_c} \quad (9)$$

The cumulative collision time $y_i(t)$ over n timing cycles, where n is a positive integer, is defined by equation (8); that is, it is obtained by integrating the function $x_i(t)$ over n cycles up to time t. The quantity $T_i$ in equation (8) represents the length of the timing cycle at node i. The cumulative collision time $y_i(t)$ is the total length of time in the n cycles up to time t during which the function $x_i(t)$ takes the value '1', and can be calculated by observing the value of the function $x_i(t)$.

The value $c_i(t)$, which is equal to $y_i(t)$ normalized by the maximum cumulative collision time, expresses the proportion of the time in the n cycles during which collisions occurred. The maximum cumulative collision time is the maximum possible value of the cumulative collision time $y_i(t)$. If each node is assumed to transmit using time slots of width $W_{min}$ ($=\phi_c/\omega_i$), the maximum cumulative collision time during n cycles is $n \cdot W_{min}$ ($=n \cdot \phi_c/\omega_i$). The collision rate $c_i(t)$ is therefore defined as in equation (9).

Because the phase $\theta$ of each node is varied according to formula (1), the period $T_i$ may take different lengths in different cycles. The cumulative collision time $y_i(t)$ may therefore exceed the maximum collision time $n \cdot W_{min}$; that is, the collision rate $c_i(t)$ may exceed '1'. When the collision rate $c_i(t)$ exceeds '1', it is set equal to '1'.

The preceding exemplary definition of the collision rate ignores the possibility of multiple collisions occurring simultaneously. The method of defining collisions, however, is not limited to the method above. It is possible to use a method that takes multiple simultaneous collisions into account. It is also possible to calculate the collision rate by counting collisions instead of calculating the total collision time.

Count-Based Collision Rate

This method counts the number of timing cycles in which collisions occur. If multiple collisions occur during the same cycle, they are counted as one collision, because only the presence or absence of collisions is considered.

Let $\gamma$ be the cumulative number of collisions in n cycles; that is, the number of cycles in which collisions occur. The count-based collision rate $c_i(t)$ is defined as the cumulative number of collisions $\gamma$ normalized by the maximum possible number of collisions (n, representing a collision in every cycle), and is therefore calculated from the following equation (10).

$$c_i(t) = \gamma/n \quad (10)$$

The collision rate calculated from equation (10), like the collision rate calculated from equation (9), may exceed '1'. As before, a collision rate exceeding '1' is treated as being equal to '1'. Counting multiple collisions occurring in the same cycle as a single collision is furthermore only one example of the counting method; it is possible to count each collision separately.

The definition of the collision rate can be generalized by using the term 'amount of collision' to denote either the time-based or the count-based quantity. The generalized collision rate is then defined as the amount of collision actually occurring in n cycles, normalized by the maximum amount of collision that can occur in n cycles.

Figure 6:
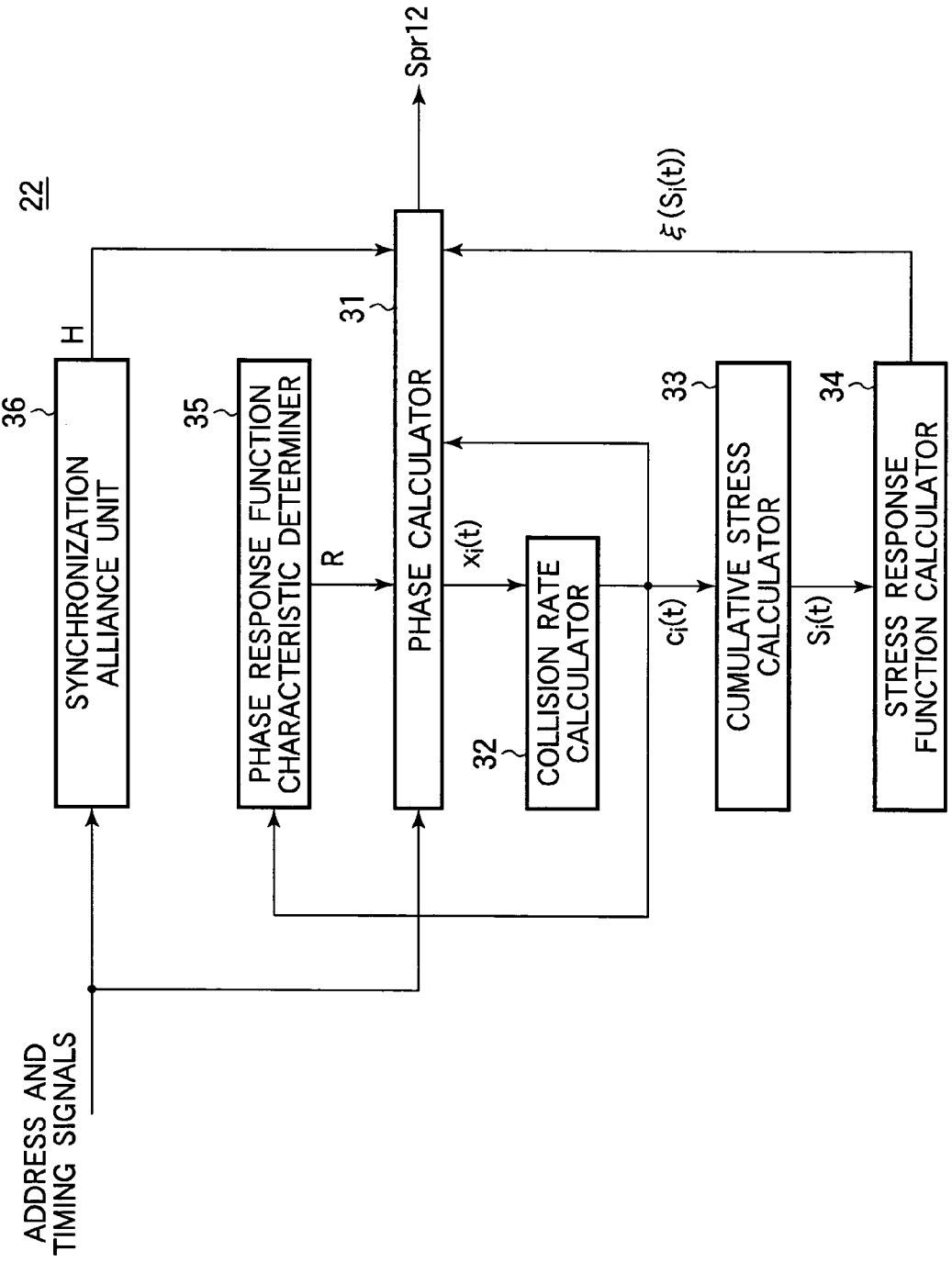
FIG. 6 is a functional block diagram of the phase dispersion and synchronization alliance unit in the first embodiment.

The collision rate calculator 32 in FIG. 6 calculates the collision rate $c_i(t)$ as defined either by equation (9) or by equation (10).

Next, a specific example of the phase response function $R(\Delta\theta_{ij}(t))$ calculated in the phase calculator 31 will be described.

As discussed above, equation (1) represents a rule for temporally varying the nonlinear oscillation rhythm of node i in response to input of received impulse signals Spr11. The received impulse signals Spr11 correspond to the output impulse signals Sout11 transmitted from neighboring nodes. By operating according to equation (1), a set of neighboring nodes attempts to set up a mutually stable set of phase differences. In the first embodiment, the phase response function $R(\Delta\theta_{ij}(t))$ has different characteristics depending on the collision rate $c_i(t)$. The phase response function characteristic determiner 35 in FIG. 6 executes the operation of altering the characteristic of the function $R(\Delta\theta_{ij}(t))$ according to the collision rate $c_i(t)$ by executing the operation in equation (12) below.

The specific example of the phase response function $R(\Delta\theta_{ij}(t))$ used in the first embodiment is given by equations (11-1) to (11-4) and equation (12).

$$R(\Delta\theta_{ij}(t)) = \alpha \cdot \left(\Delta\theta_{ij}(t) - \frac{2\pi}{p}\right) \quad \Delta\theta_{ij}(t) \leq \frac{2\pi}{p} \tag{11-1}$$

$$R(\Delta\theta_{ij}(t)) = \beta(ci(t)) \cdot \Delta\tilde{\theta}_{ij}(t)\frac{2\pi}{p} < \Delta\theta_{ij}(t) < 2\pi - p \text{ and } \Delta\tilde{\theta}_{ij}(t) < \frac{\pi}{p} \tag{11-2}$$

$$R(\Delta\theta_{ij}(t)) = \tag{11-3}$$
$$\beta(ci(t)) \cdot \left(\Delta\tilde{\theta}_{ij}(t) - \frac{2\pi}{p}\right)\frac{2\pi}{p} < \Delta\theta_{ij}(t) < 2\pi - p \text{ and } \Delta\tilde{\theta}_{ij}(t) > \frac{\pi}{p}$$

$$R(\Delta\theta_{ij}(t)) = \alpha \cdot \left(\Delta\theta_{ij}(t) - \frac{(p-1)\pi}{p}\right) \quad 2\pi - \frac{2\pi}{p} \leq \Delta\theta_{ij}(t) \tag{11-4}$$

$$\beta(ci(t)) = b \cdot (1 - ci(t))^2 \tag{12}$$

The wave (~) notation in equations (11-2) and (11-3) indicates $\Delta(\theta_{ij}(t))$ calculated modulo $2\pi/p$; that is, $\Delta(\theta_{ij}(t))$ is divided by $2\pi/p$ and the remainder is taken.

Equations (11-1) to (11-4) and (12) define a phase response function $R(\Delta\theta_{ij}(t))$ that attempts to establish uniform phase differences among neighboring nodes. The quantity p is a parameter that determines the uniform phase difference. That is, when a cycle is divided into p parts, each part subtends a phase angle of $2\pi/p$. The optimum value of p depends on the node arrangement, and can be determined experimentally. The phase angle $2\pi/p$ must be equal to or greater than the minimum phase with $\phi_c$ necessary for data transmission ($2\pi/p \geq \phi_c$). The quantities $\alpha$ and b are constant parameters that, like p, can be determined experimentally.

The phase response function $R(\Delta\theta_{ij}(t))$ is of course not limited to the form given above. The invention can be practiced with various other functions that vary the phase of a node relative to the phase of a neighboring node according to the collision rate $c_i(t)$.

Next, a specific example of the stress response function $\xi(S_i(t))$ calculated by the processing executed successively in the cumulative stress calculator 33 and stress response function calculator 34 will be described. This exemplary stress response function $\xi(S_i(t))$ is defined by the following formulas (13-1), (13-2), (14-1), (14-2), and (15).

$$\xi(S_i(t)) = q(S_i(t)) \quad t = m \cdot n \cdot T_k \tag{13-1}$$

$$\xi(S_i(t)) = 0 \quad t = m \cdot n \cdot T_k \quad (m = 1, 2, \ldots) \tag{13-2}$$

$$q(S_i(t)) = \mu \quad \text{with probability } S_i(t) \tag{14-1}$$

$$q(S_i(t)) = 0 \quad \text{with probability } 1 - S_i(t) \tag{14-2}$$

$$S_i(t) = \int_{ts}^{t} s(ci(\tau))d\tau \tag{15}$$

The function $s(c_i(t))$ in equation (15) expresses the stress value for a collision rate $c_i(t)$ at time t. Various functions that indicate higher stress values as the collision rate $c_i(t)$ increases can be used. One class of examples includes the sigmoid function and other nonlinear functions in which the stress value rises steeply as the collision rate $c_i(t)$ increases.

The function $S_i(t)$ defined by equation (15) gives the cumulative stress at time t, that is, the value of the stress function $s(c_i(t))$ integrated over time. The interval over which the stress is accumulated starts at the time $t_s$ when the preceding random phase shift was executed in response to the cumulative stress value $S_i(t)$ and ends at time t. That is, the function $S_i(t)$ is reset when a random phase shift is executed, and starts accumulating stress again from that time. If the time t is given in discrete form, the integration calculation can be carried out by taking the total sum of the stress values $s(c_i(t))$ at the individual discrete times. The cumulative stress calculator 33 calculates the cumulative stress $S_i(t)$.

The function $q(S_i(t))$ defined by formulas (14-1) and (14-2) returns a random number with a probability responsive to the cumulative stress $S_i(t)$. Specifically, it returns the value $\mu$ with probability $S_i(t)$, and the value zero with probability $1-S_i(t)$. The value $\mu$ is a random number on the interval $\epsilon \leq \mu < \delta$, where the values of $\epsilon$ and $\delta$ are constant parameters that should be determined experimentally.

The stress response function $\xi(S_i(t))$ evaluates the stress function $S_i(t)$ at intervals of n timing cycles and returns a random value ($\mu$ or 0) with a corresponding probability. The stress response function calculator 34 calculates the stress response function $\xi(S_i(t))$.

Accordingly, due to the introduction of the stress response function $\xi(S_i(t))$ into the nonlinear oscillation model in equation (1) above, (I) the cumulative stress function $S_i(t)$ is evaluated at intervals of n timing cycles, and (II) a random phase shift is executed with a probability based on the value of the cumulative stress function $S_i(t)$. The greater the accumulated stress value is, the higher the probability that a random phase shift will be executed becomes. At times other than integer multiples of n cycles, the value of the stress response function $\xi(S_i(t))$ is zero and a random phase shift is not executed. It should be noted that stress accumulation is not limited to n cycles; stress is accumulated over the interval from the time $t_s$ of the last preceding random phase shift to the present time t. Consequently, even when the stress value $s(c_i(t))$ is small, if it continues to accumulate for a sufficiently long time past n cycles, eventually the cumulative stress $S_i(t)$ will become large enough to lead to a random phase shift.

The phase calculator 31 uses the stress response function $\xi(S_i(t))$ to calculate the phase $\theta_i(t)$ defined in equation (1).

The communication timing calculator 12 that carries out the computations described above may be implemented in software, in hardware comprising a group of electronic circuits for executing mathematical operations, or in a combination of hardware and software.

For example, as means for executing the calculation shown in equation (1), a node may be provided with software for executing well-known numerical analysis methods such as the Runge-Kutta method. (For a Japanese description of the Runge-Kutta method, see UNIX Wakusuteishon ni yoru Kagaku Gijutsu Keisan Handobukku—Kiso-hen C-gengo ban (Handbook of Scientific and Engineering Computation on UNIX Workstations—Basic C Language Edition) by Hayato Togawa, published by Saiensu Co.) The Runge-Kutta method is one method of calculating changes in a state variable (calculating a time series) by using difference equations (recursion formulas) obtained from differential equations by converting a continuous time variable to discrete time. It is also possible to calculate changes in a state variable by use of difference equations obtained from differential equations by other methods of described in the above reference.

Figure 7:
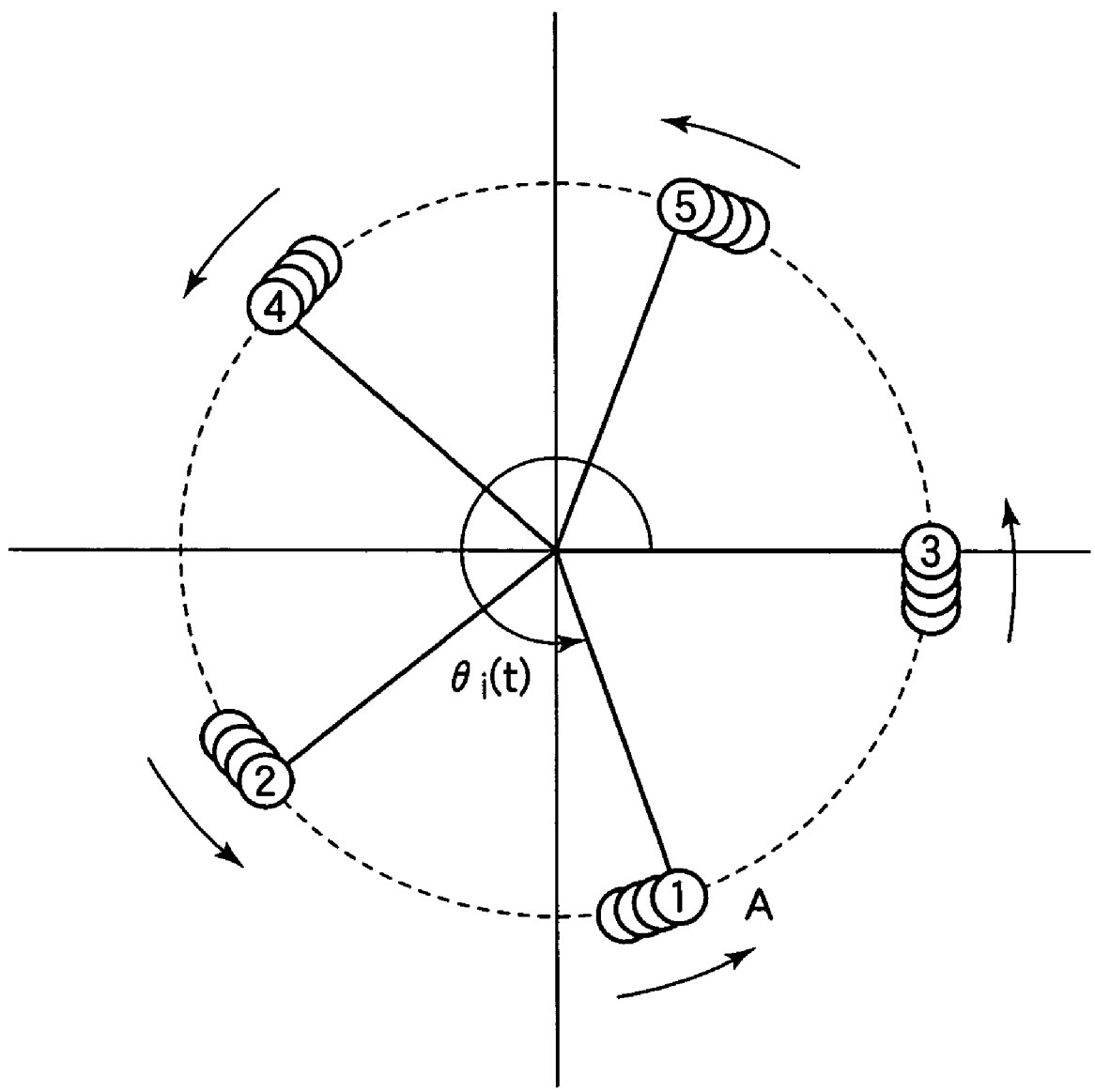
FIG. 7 illustrates phase relationships established among a set of interacting nodes in the first embodiment.

When each node executes the computation expressed by equation (1), an appropriate phase relationship is formed between mutually interacting nodes. FIG. 7 shows examples of phase relationships formed between a node of interest A and neighboring nodes in the mutual interaction range shown in FIG. 1.

Node of interest A and its four neighboring nodes within data transmission range L establish phase relationships that divide the timing cycle into five parts. The other nodes in the mutual interaction range of node A are in phase with node A or one of these four neighboring nodes. The nodes in phase with each other have the same circled number in FIG. 1. With these phase relationships, node A and its four closest neighboring nodes can acquire time slots by dividing the timing cycle into five parts.

The pattern of allied neighboring nodes around node A is the same as the pattern of allied neighboring nodes around other nodes in FIG. 1, so the nodes within mutual interaction range of any node in FIG. 1 establish a phase relationship like the one in FIG. 7, except for nodes on the system boundaries. Accordingly, an optimal time-division communication scheme can be implemented in which neighboring nodes adjust their time slot assignments so as to share time equally with other nodes within the data communication range. This communication scheme has very little lost time, resulting in highly efficient communication.

As described above, in a data transmission method in which a plurality of nodes adjust their time slot assignments autonomously in a distributed manner by transmitting and receiving impulse signals, the first embodiment adds a synchronization alliance unit to the internal structure of the communication timing calculator, and adds information (address information) indicating the spatial location of a node to the impulse signals transmitted by the node, whereby, when the nodes are arranged in a grid, mutually adjacent nodes can interact among themselves to reach an ideal sharing of time slots. As a result, communication can be carried out at an ideal level of efficiency with very little loss of time.

SECOND EMBODIMENT

Next a communication control apparatus, communication control method, node, and communication system according to a second embodiment of the invention will be described.

Instead of interacting intermittently by transmitting and receiving impulse signals as in the first embodiment, the nodes in the second embodiment interact continuously by transmitting and receiving phase information $\theta_i(t)$ directly as state variable signals. The state variable or mutual interaction signals also includes information indicating the spatial location of the transmitting node.

The state variable signals in the second embodiment are transmitted in a separate frequency band from the frequency band used to transmit data signals. The state variable signal frequency band is further divided into a number Nb of sub-bands, where Nb is an integer greater than the number of alliances formed in the communication system, and each state variable signal is transmitted in one of the sub-bands. In the configuration in FIG. 1, for example, there may be twenty-five sub-bands, so that node A and the twenty-four nodes within a radius of $\sqrt{8}L$ of node A can all transmit state variable signals in different sub-bands.

A state variable signal is, for example, a phase-modulated (PM) signal conveying a series of serial numbers that increase to a maximum value Na, then return to zero and being increasing again. Each serial number is followed by a numeric value giving the current phase $\theta_i(t)$ of the transmitting node and address information giving the spatial location of the transmitting node, as in the first embodiment. The serial numbers may cycle from zero to Na once per timing cycle, for example, so that phase information is transmitted Na times per timing cycle instead of just once per timing cycle as in the first embodiment.

The state variables will be denoted Sout31 when transmitted and Sin31 when received. Data signals will be denoted Sout32 when transmitted and Sin32 when received.

Figure 8:
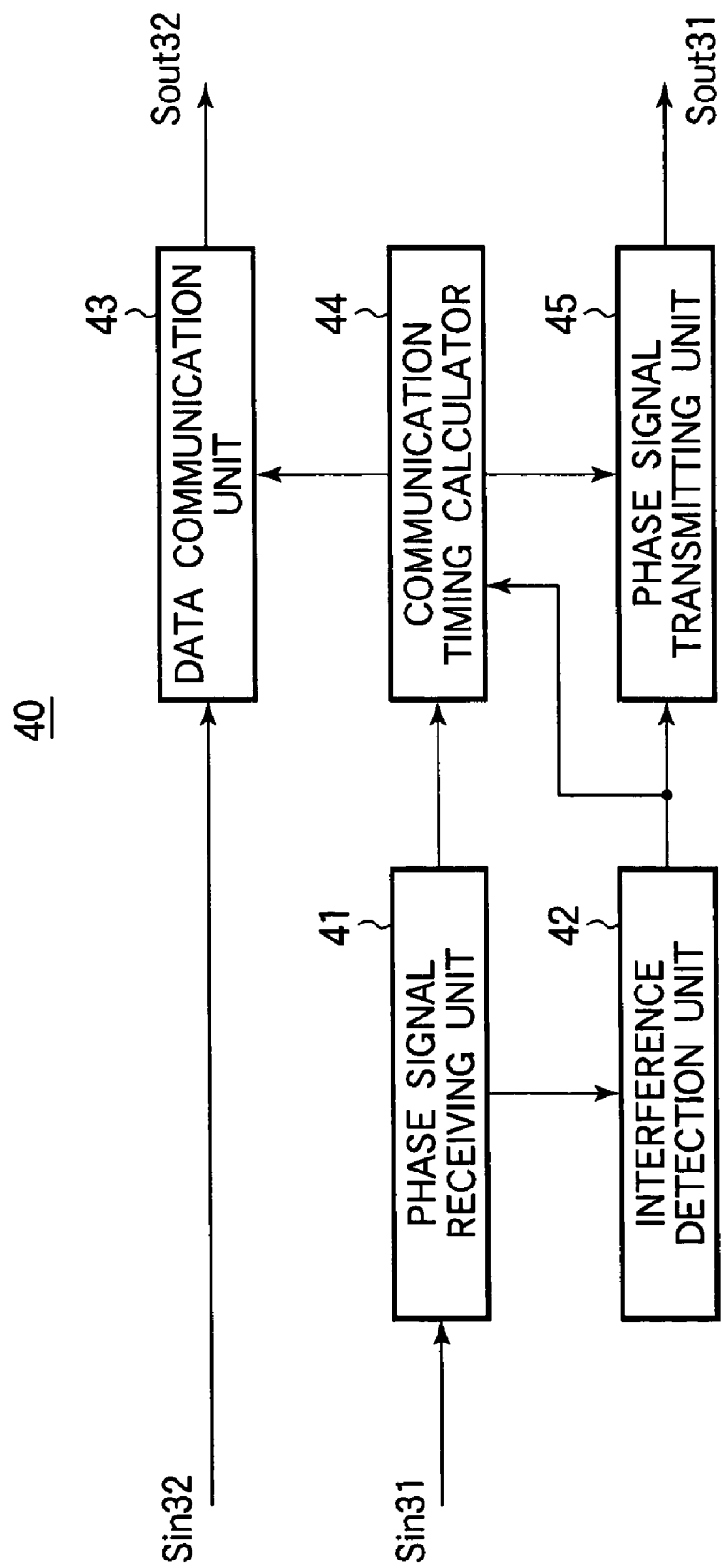
FIG. 8 is a functional block diagram of a node in a second embodiment.

FIG. 8 is a functional block diagram of a node in the second embodiment. The node 40 has a phase signal receiving unit 41, an interference detection unit 42, a data communication unit 43, a communication timing calculator 44, and a phase signal transmitting unit 45. The data communication unit 43 is generally similar to the data communication unit 15 of the first embodiment. The node 40 also has a steady-state decision unit and sensor (not shown) as in the first embodiment.

The phase signal receiving unit 41, which replaces the impulse signal receiving unit 11 of the first embodiment, has receiving circuits tuned to each of the Nb sub-bands of the state variable signal band. Normally the signal received in each sub-band originates from a single neighboring node j. The phase signal receiving unit 41 demodulates the received signal to detect the serial numbers included therein, sends the serial numbers to the interference detection unit 42, and sends the rest of the received signal, including the phase information and address information, to the communication timing calculator 44.

The interference detection unit 42 checks whether the serial numbers received from the phase signal receiving unit 41 increase in series in each sub-band. If they do not, the interference detection unit 42 generates a result signal indicating that interference has been detected; otherwise, the result signal indicates that interference has not been detected. This result signal is sent to the communication timing calculator 44 and the phase signal transmitting unit 45. When interference is detected, the interference detection unit 42 also sends the phase signal transmitting unit 45 the sub-band number of the sub-band in which interference was detected.

The communication timing calculator 44 generates a phase signal $\theta_i(t)$ for its own node i in accordance with the phase signals $\theta_j(t)$ of neighboring nodes j, as described in further detail later.

The phase signal transmitting unit 45 transmits an output phase signal Sout31 including the cyclically increasing serial number, the phase signal $\theta_i(t)$ of its own node i, and address information. When interference is detected, the phase signal transmitting unit 45 sends the sub-band number of the sub-band in which interference was detected in addition to, or in place of, the phase information, to advise the interfering nodes to reduce their transmitting power.

Figure 9:
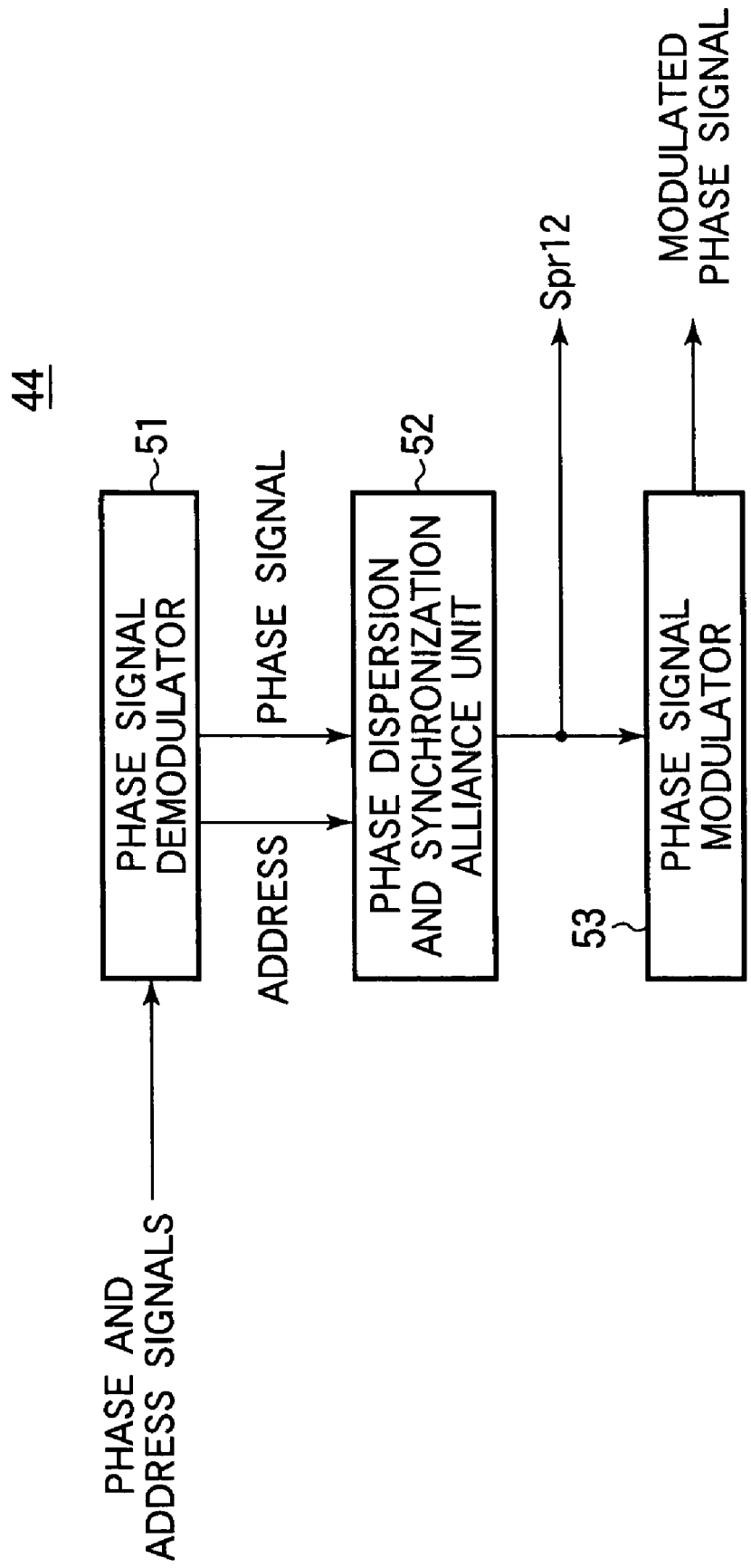
FIG. 9 is a functional block diagram of the communication timing calculator in the second embodiment.

Referring to FIG. 9, the communication timing calculator 44 has a phase signal demodulator 51, a phase dispersion and synchronization alliance unit 52, and a phase signal modulator 53.

The phase signal demodulator 51 demodulates the signal received from the phase signal receiving unit 41 to obtain the current phase and the spatial location of the transmitting node, and sends this information to the phase dispersion and synchronization alliance unit 52.

The phase dispersion and synchronization alliance unit 52 includes a means of effecting a synchronization alliance, and executes a phase computation to determine the communication timing of its own node.

The phase signal modulator 53 modulates the phase signal of its own node obtained as a result of the phase computation by the phase dispersion and synchronization alliance unit 52, in accordance with information indicating the spatial location of the node. The modulated phase signal generated by the phase signal modulator 53 is supplied to the phase signal transmitting unit 45 for transmission as a state variable signal.

Figure 10:
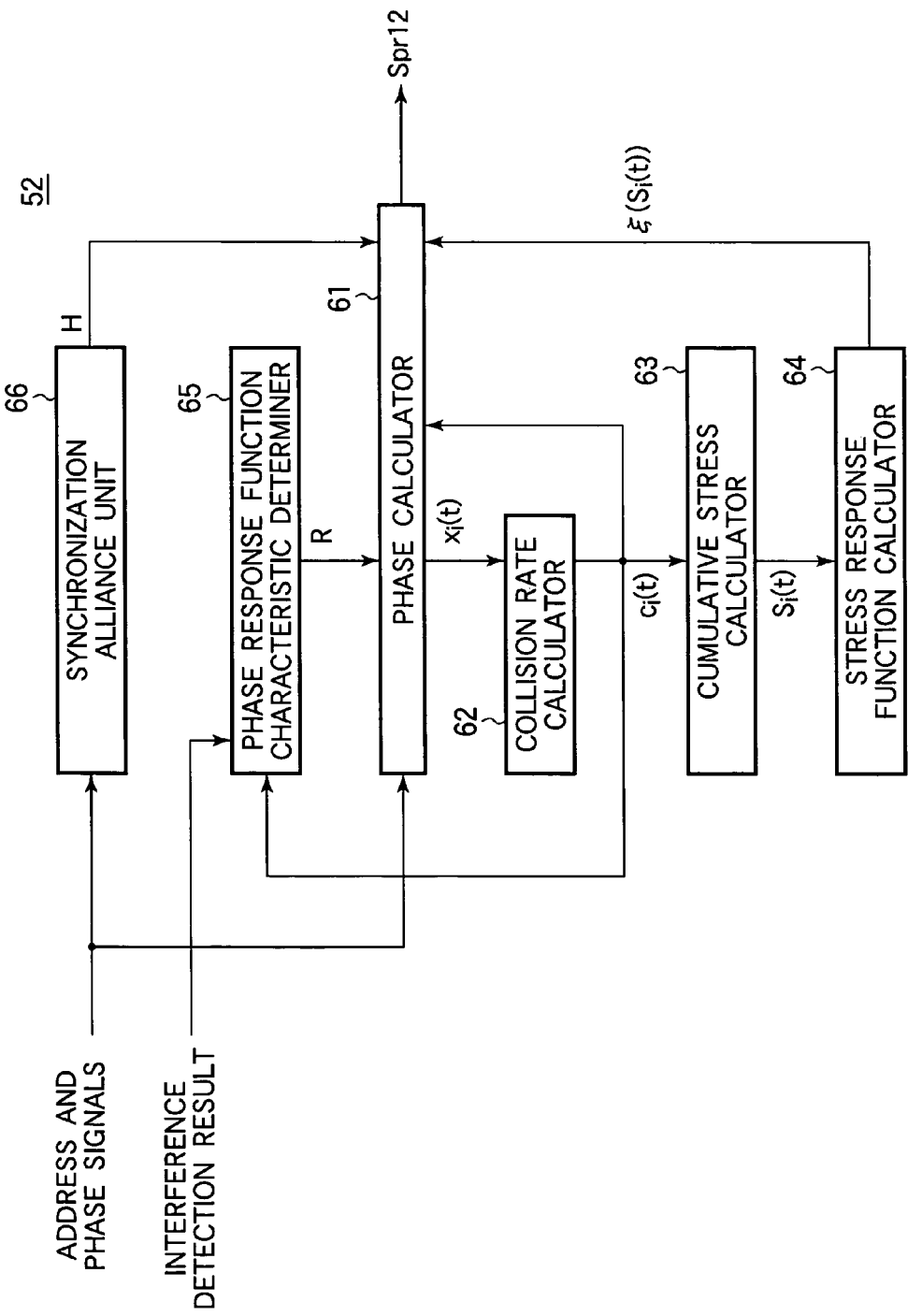
FIG. 10 is a functional block diagram of the phase dispersion and synchronization alliance unit in the second embodiment.

Referring to FIG. 10, the phase dispersion and synchronization alliance unit 52 includes a phase calculator 61, a collision rate calculator 62, a cumulative stress calculator 33, a stress response function calculator 64, a phase response function characteristic determiner 65, and a synchronization alliance unit 66.

The phase calculator 61 carries out phase computations by using an equation expressing a nonlinear oscillation model, such as equation (16) given below. The phase difference $\Delta\theta_{ij}(t)$ is defined by equation (17) as in the first embodiment. The phase response function $R(\Delta\theta_{ij}(t))$, the synchronization alliance function $H(\Delta\theta_{ij}(t))$, the stress response function $\xi(S_i(t))$, and sets $X_i$ of non-allied neighboring nodes and $Y_i$ of allied neighboring nodes are the same as in the first embodiment.

$$\frac{d\theta_i(t)}{dt} = \omega_i + \frac{K_x}{N_x}\sum_{j\in Xi} R(\Delta\theta_{ij}(t)) + \frac{K_y}{N_y}\sum_{j\in Yi} H(\Delta\theta_{ij}(t)) + \xi(S_i(t)) \quad (16)$$

$$\Delta\theta_{ij}(t) = \theta_j(t) - \theta_i(t) \quad (17)$$

$N_x$ in the term including the phase response function $R(\Delta\theta_{ij}(t))$ represents the number of nodes in set $X_i$, and $K_x$ is a coupling constant parameter. $N_y$ in the term including the synchronization alliance function $H(\Delta\theta_{ij}(t))$ represents the number of elements in node set $Y_i$, and $K_y$ is another coupling constant parameter. The coupling constant parameters $K_x$ and $K_y$ determine the level of contribution of the terms including $R(\Delta\theta_{ij}(t))$ and $H(\Delta\theta_{ij}(t))$ to the temporal evolution of the corresponding phases; their values can be determined experimentally.

The collision rate calculator 62, cumulative stress calculator 33, stress response function calculator 64, phase response function characteristic determiner 65, and synchronization alliance unit 66 operate in the same way as the corresponding elements in the first embodiment, except that the phase response function characteristic determiner 65 receives the interference detection result signal from the interference detection unit 42. When the interference detection result signal indicates that interference was detected, the phase response function characteristic determiner 65 temporarily modifies the phase response function (to a predetermined constant value, for example) so that unreliable phase values which may have been corrupted by the interference will not affect the phase of node i.

The communication timing calculator 44 that carries out the computations described above may be implemented in software, in hardware comprising a group of electronic circuits for executing mathematical operations, or in a combination of hardware and software.

When each node shown in FIG. 1 carries out the computation expressed by equation (16), a phase relationship as shown in the first embodiment is formed among the nodes within the mutual interaction range.

According to the second embodiment, in a data communication system in which a plurality of nodes mutually adjust their time slot assignments in an autonomous and distributed manner by exchanging phase signals with one another, a synchronization alliance means is included in the communication timing calculator, and information indicating the spatial location (address) of the transmitting node is added to the phase signals exchanged as interaction signals, so that the nodes arranged in a grid can determine their own time slot assignments by interacting with their neighboring nodes and can reach an optimal mode of time-division communication. Consequently, communication can be carried out at an ideal level of efficiency with very little loss of time.

In a variation of the second embodiment, the spatial location of a node transmitting a state variable signal is indicated by the frequency sub-band number of the state variable signal, instead of by an explicit address. The frequency sub-band number does not identify the location of the node uniquely, but at least identifies the synchronization alliance to which the node belongs.

Many other variations of the preceding embodiments are also possible.

The natural angular frequency parameter $\omega_i$ need not have a fixed uniform value throughout the system. The system can operate with a different value of $\omega_i$ at each node. For example, the values of $\omega_i$ at the nodes may lie near a central value around which they are distributed according to a Gaussian probability distribution.

A differential equation (1) was used to describe the processing performed by the communication timing controller 12, but other types of equations can be used instead. One example is a difference equation or recursion formula obtained by changing the continuous time variable t in equation (1) to a discrete time variable as shown below.

$$\theta_i(u+1) = \theta_i(u) + \left[\omega_i + \sum_{j=1}^{N} P_j(u) \cdot R(\Delta\theta_{ij}(u)) + \xi(S_i(u))\right] \cdot \Delta t \quad (18)$$

$u = 0, 1, 2, \ldots$ $\Delta t$: discrete time step width

In the equation above, u is a discrete time variable taking on positive integer values. The other symbols have the same meanings as in the first embodiment, except that they are all functions of the discrete time variable u. The quantity $\Delta t$ indicates the step width of discrete time. The continuous time variable t and the discrete time variable u are related by $\Delta t$ (more specifically, $t = u \cdot \Delta t$). Equation (18) indicates how the phase $\theta_i(u)$ at time u is used to calculate the phase $\theta_i(u+1)$ at the next time u+1.

In the equation above, only the time axis is treated in discrete steps, but it is also possible to have the state variables take on discrete values. That is, the state variables can be quantized. In this case, the phase signal $\theta_i(t)$ is quantized and takes on M discrete values, where M is a positive integer. In the equation below, quantization is expressed by a quantizing function quan(*) that converts an arbitrary continuous quantity (*) to an integer by dividing the quantity by a quantization step width w and ignoring the remainder. The quantization step width w is equal to the dynamic range of the quantity (*) divided by M. For the phase signal $\theta_i(t)$, the quantization step width w is equal to $2\pi/M$.

$$\theta(u+1) = \theta(u) + quan\left(\left[\omega_i + \sum_{j=1}^{N} P_j(u) \cdot R(\Delta\theta_{ij}(u)) + \xi(S_i(u))\right] \cdot \Delta t\right) \quad (19)$$

$u = 0, 1, 2, \ldots$ $\Delta t$: discrete time step width

A similar discrete or difference notation can be used in equation (16) in the second embodiment. Either calculation can be carried out at the node by software.

In equations (18) and (19), summation from 1 to N may be replaced by summation over the set $X_i$, and a further term summing $P_j(u) \cdot H(\Delta\theta_{ij}(u))$ over the set $Y_i$ may also be included, as in the first embodiment. These equations may also be modified for continuous transmission of state variable signals as in the second embodiment.

Equations (1) and (16) were shown in the first and second embodiments as formulas for modeling nonlinear oscillation, but as noted above, other descriptions of nonlinear oscillation can be used. For example, it is possible to use the well-known van der Pool equation and other general models of nonlinear oscillation or chaotic oscillation, regardless of whether the mutual interactions between nodes take place continuously or at discrete intervals. (For a Japanese discussion of the van der Pool equation, see Toda et al., Hisenkei Rikigaku (Nonlinear Dynamics), Kyoritsu Shuppan.) The van der Pool equation models nonlinear oscillatory phenomena in electronic circuits. Although this model can be incorporated into the present invention by providing hardware circuits that actually exhibit the modeled oscillations, the model can also be incorporated in software by using general methods of numerical analysis, such as the Runge-Kutta method.

The present invention does not depend on the particular nonlinear oscillatory behavior that is modeled or the particular mathematical expression of the model. Time and operating states may be treated as discrete or continuous variables, and interactions may take place continuously or at discrete intervals. Operating states may vary periodically or chaotically.

In the preceding embodiments, the neighboring nodes interacted by wireless communication, but the invention is not limited to wireless communication. The invention can also be practiced in a system in which a number of spatially distributed nodes exchange data over wires. For example, the invention can be applied to a wired local area network (LAN) such as an Ethernet network (Ethernet is a registered trademark), or a wired network linking a mixture of different types of nodes, such as sensor nodes, actuator nodes, or server nodes. The invention may also be practiced in a network in which wired connections and wireless connections are mixed.

The present invention can also be used as a communication protocol for exchanging routing tables between routers at different timings on the Internet. A router is a relay node device that routes information to its destination on a network by selecting communication paths. A routing table is essentially a communication path selection rule referred to when information is routed. To achieve efficient communication, it is necessary to keep updating the routing tables in response to changes in network topology, local traffic conditions, and so on. Each router therefore periodically transmits routing table information to the other routers in the network.

As shown by Floyd et al. in "The Synchronization of Periodic Routing Messages", *IEEE/ACM Transactions on Networking*, Vol. 2, No. 2, pp. 122-136, April 1994, even though different routers transmit their routing tables independently, these transmissions have a tendency to become mutually synchronized. Floyd et al. propose a method of avoiding synchronization by imposing random variability on the period between routing table transmissions, and this method is shown to produce some effect. Because the method depends only on randomness, however, an undesirably high degree of randomness is required to achieve even a modest effect.

If the present invention is applied to the transmission of routing tables, neighboring routers can adjust the time slots in which they transmit routing tables autonomously among themselves, so that different routers transmit routing tables at different times. Because the routers actively avoid each other's time slots, the method of the present invention achieves a greater effect than the method proposed by Floyd et al., while requiring less randomness.

The invention can be used to avoid collision or synchronization in all types of networks, whether wireless or wired, and it can be used as a communication protocol for achieving efficient data communication possessing with both adaptability and stability.

The present invention is characterized by its acquisition and control of communication timing information (the phase signal in the embodiments), without regard to the use that is made of the timing information. If different nodes transmit data signals at different frequencies, for example, they can communicate without set time slots, but even in this case they may use the communication timing information to determine when to initiate data communication.

The form of the phase response function is not limited to the exemplary function $R(\Delta\theta_{ij}(t))$ used in the first and second embodiments. Other types of phase response functions can be used instead.

In the first and second embodiments, the phase response function $R(\Delta\theta_{ij}(t))$ was defined by combining different functions of the phase difference $\Delta\theta_{ij}(t)$, some of which included functions of the collision rate $c_i(t)$ as stress response values, but the phase response function $R(\Delta\theta_{ij}(t))$ can be defined by combining different functions of the phase difference $\Delta\theta_{ij}(t)$ alone, without including a response to the collision rate $c_i(t)$.

Of the many variations shown in the specifications and drawings of Japanese Patent Applications No. 2003-328530, No. 2004-257562, and No. 2004-254567, which are related to the present application, those variations that are applicable to the present invention are included herein by reference.

Those skilled in the art will recognize that further variations are possible within the scope of the present invention, which is defined in the appended claims.

What is claimed is:

1. A timing control apparatus installed in each of a plurality of nodes constituting a communication system, the nodes being arranged in a grid, the timing control apparatus including a communication timing calculator for determining timings of data transmission from its own node according to variations in a phase state internal to the node, the communication timing calculator comprising:

a phase calculator for varying a phase state of its own node according to a time series rule based on a predetermined phase response function and a predetermined synchronization alliance function, according to reception of state variable signals from neighboring nodes, the state variable signals representing a phase indicating a timing of data transmission from the neighboring nodes;

a collision rate calculator for observing phase differences between its own node and the neighboring nodes and calculating a collision rate representing a rate of collision between timings of data transmission from its own node and timing of data transmission from the neighboring nodes;

a phase response function characteristic determiner for altering characteristics of the phase response function according to the collision rate and to positional information included in the state variable signals, the positional information indicating positions of the neighboring nodes; and a synchronization alliance unit for altering characteristics of the synchronization alliance function according to the positional information included in the state variable signals.

2. The communication control apparatus of claim 1, wherein the communication timing calculator further comprises a stress response function generator that integrates a stress value responsive to the collision rate over time, and causes a phase shift of random size in the time series rule used by the phase calculator responsive to the integrated stress value.

3. The communication control apparatus of claim 1, wherein:
when the neighboring nodes are disposed in predetermined spatial positions within a mutual interaction range within which the state variable signals are communicable, the synchronization alliance unit provides the synchronization alliance function with a dynamic characteristic for synchronizing the phase of its own node to the phases of the neighboring nodes; and
when the neighboring nodes are disposed at positions other than the predetermined spatial positions, the phase response function characteristic determiner gives the phase response function a dynamic characteristic that repels the phase of its own node from the phases of the neighboring nodes.

4. The communication control apparatus of claim 3 wherein, if L represents the distance between adjacent nodes in the grid, then the nodes have a data communication range of substantially L and a mutual interaction range, by means of the state variable signals, of substantially $5^{1/2}L$, and the nodes in the predetermined spatial positions are disposed at coordinates (2L, L), (-L, 2L), (-2L, -L), and (L, -2L) in a Cartesian coordinate system centered on said its own node and having axes aligned with the grid.

5. The communication control apparatus of claim 3 wherein, if L represents the distance between adjacent nodes in the grid, then the nodes have a data communication range of substantially L and a mutual interaction range, by means of the state variable signals, of substantially $5^{1/2}L$, and the nodes in the predetermined spatial positions are disposed at coordinates (-2L, L), (L, 2L), (2L, -L), and (-L, -2L) in a Cartesian coordinate system centered on said its own node and having axes aligned with the grid.

6. The communication control apparatus of claim 1, wherein the state variable signals are transmitted at a predetermined phase in the timing cycle.

7. The communication control apparatus of claim 1, wherein the state variable signals are transmitted continuously throughout the timing cycle.

8. A node including the communication control apparatus of claim 1.

9. A communication system including a plurality of nodes as recited in claim 8, arranged in a grid.

10. A communication control method employed in each of a plurality of nodes constituting a communication system to determine timings of data transmission from each node according to variations in a phase state internal to the node, the nodes being arranged in a grid, the method comprising:
varying a phase state of a node of interest according to a time series rule based on a predetermined phase response function and a predetermined synchronization alliance function, according to reception of state variable signals from neighboring nodes, the state variables signals representing a phase indicating a timing of data transmission from the neighboring nodes;
observing phase differences between the node of interest and the neighboring nodes and calculating a collision rate representing a rate of collision between timings of data transmission from the node of interest and timing of data transmission from the neighboring nodes;
altering characteristics of the phase response function according to the collision rate and to positional information included in the state variable signals, the positional information indicating positions of the neighboring nodes; and
altering characteristics of the synchronization alliance function according to the positional information included in the state variable signals.

11. The communication control method of claim 10, further comprising:
integrating a stress value responsive to the collision rate over time; and
causing a phase shift of random size in the time series rule responsive to the integrated stress value.

12. The communication control method of claim 10, wherein:
the predetermined synchronization alliance function has a dynamic characteristic for synchronizing the phase of its own node to the phases of the neighboring nodes disposed in predetermined spatial positions within a mutual interaction range within which the state variable signals are communicable; and
the predetermined phase response function has a dynamic characteristic that repels the phase of its own node from the phases of neighboring nodes disposed at positions other than the predetermined spatial positions.

13. The communication control method of claim 12 wherein, if L represents the distance between adjacent nodes in the grid, then the nodes have a data communication range of substantially L and a mutual interaction range, by means of the state variable signals, of substantially $5^{1/2}L$, and the nodes in the predetermined spatial positions are disposed at coordinates (2L, L), (-L, 2L), (-2L, -L), and (L, -2L) in a Cartesian coordinate system centered on said its own node and having axes aligned with the grid.

14. The communication control method of claim 12 wherein, if L represents the distance between adjacent nodes in the grid, then the nodes have a data communication range of substantially L and a mutual interaction range, by means of the state variable signals, of substantially $5^{1/2}L$, and the nodes in the predetermined spatial positions are disposed at coordinates (-2L, L), (L, 2L), (2L, -L), and (-L, -2L) in a Cartesian coordinate system centered on said its own node and having axes aligned with the grid.

15. The communication control method of claim 10, wherein the state variable signals are transmitted at a predetermined phase in the timing cycle.

16. The communication control method of claim 10, wherein the state variable signals are transmitted continuously throughout the timing cycle.

* * * * *